United States Patent
Isaac et al.

(10) Patent No.: US 7,133,975 B1
(45) Date of Patent: Nov. 7, 2006

(54) CACHE MEMORY SYSTEM INCLUDING A CACHE MEMORY EMPLOYING A TAG INCLUDING ASSOCIATED TOUCH BITS

(75) Inventors: Roger D. Isaac, Austin, TX (US); Mitchell Alsup, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 304 days.

(21) Appl. No.: 10/347,827

(22) Filed: Jan. 21, 2003

(51) Int. Cl.
*G06F 12/00* (2006.01)

(52) U.S. Cl. ..................................... 711/141
(58) Field of Classification Search ............... 711/122, 711/144, 141, 143, 128, 138
See application file for complete search history.

(56) References Cited

U.S. PATENT DOCUMENTS

| | | | |
|---|---|---|---|
| 5,694,573 A * | 12/1997 | Cheong et al. ............. | 711/122 |
| 5,996,048 A * | 11/1999 | Cherabuddi et al. ....... | 711/122 |
| 6,360,301 B1 | 3/2002 | Gaither et al. | |
| 6,647,466 B1 * | 11/2003 | Steely, Jr. .................. | 711/138 |
| 6,763,432 B1 | 7/2004 | Charney et al. | |
| 2002/0010836 A1 * | 1/2002 | Barroso et al. ............. | 711/122 |

FOREIGN PATENT DOCUMENTS

KR  PCT/KR01/00793  *  5/2001

\* cited by examiner

*Primary Examiner*—Mano Padmanabhan
*Assistant Examiner*—Duc T Doan
(74) *Attorney, Agent, or Firm*—Meyertons Hood Kivlin Kowert & Goetzel, P.C.; B. Noäl Kivlin; Stephen J. Curran

(57) ABSTRACT

A cache memory system including a cache memory employing a tag including associated touch bits. The system includes a first cache memory subsystem having a first cache storage and a second cache memory subsystem including a second cache storage. The first cache storage may store a first plurality of cache lines of data. The second cache storage may store a second plurality of cache lines of data. Further the second cache memory subsystem includes a tag storage which may store a plurality of tags each corresponding to a respective cache line of the second plurality of cache lines. In addition, each of said plurality of tags includes an associated bit indicative of whether a copy of the corresponding respective cache line is stored within the first cache memory subsystem.

20 Claims, 4 Drawing Sheets

CACHE MEMORY SYSTEM INCLUDING A CACHE MEMORY EMPLOYING A TAG INCLUDING ASSOCIATED TOUCH BITS

BACKGROUND OF THE INVENTION

1. Field of the Invention

This invention relates to microprocessors and, more particularly, to cache subsystems within a microprocessor.

2. Description of the Related Art

Typical computer systems may contain one or more microprocessors which may be connected to one or more system memories. The processors may execute code and operate on data that is stored within the system memories. It is noted that as used herein, the term "processor" is synonymous with the term microprocessor. To facilitate the fetching and storing of instructions and data, a processor typically employs some type of memory system. In addition, to expedite accesses to the system memory, one or more cache memories may be included in the memory system. For example, some microprocessors may be implemented with one or more levels of cache memory. As used herein, a the level of the cache refers the cache's proximity to the microprocessor core relative to another cache's proximity to the microprocessor core. In this example, the L1 cache is considered to be at a higher level than the L2 cache. In a typical microprocessor, a level one (L1) cache and a level two (L2) cache may be used, while some newer processors may also use a level three (L3) cache. In many legacy processors, the L1 cache may reside on-chip and the L2 cache may reside off-chip. However, to further improve memory access times, many newer processors may use an on-chip L2 cache.

The L2 cache is often implemented as a unified cache, while the L1 cache may be implemented as a separate instruction cache and a data cache. The L1 data cache is used to hold the data most recently read or written by the software running on the microprocessor. The L1 instruction cache is similar to L1 data cache except that it holds the instructions executed most frequently. It is noted that for convenience the L1 instruction cache and the L1 data cache may be referred to simply as the L1 cache, as appropriate. The L2 cache may be used to hold instructions and data that do not fit in the L1 cache. The L2 cache may be exclusive (e.g., it stores information that is not in the L1 cache) or it may be inclusive (e.g., it stores a copy of the information that is in the L1 cache).

During a read or write to cacheable memory, the L1 cache is first checked to see if the requested information (e.g., instruction or data) is available. If the information is available, a hit occurs. If the information is not available, a miss occurs. If a miss occurs, then the L2 cache may be checked. Thus, when a miss occurs in the L1 cache but hits within, L2 cache, the information may be transferred from the L2 cache to the L1 cache in a cache line fill. As described below, the amount of information transferred between the L2 and the L1 caches is typically a cache line. In addition, depending on the space available in the L1 cache, a cache line may be evicted from the L1 cache to make room for the new cache line and may be subsequently stored in L2 cache. If the cache line that is being evicted is in a modified state, the microprocessor may perform a cache line write-back to system memory when it performs the cache line fill. These write-backs help maintain coherency between the caches and system memory.

Memory subsystems typically use some type of cache coherence mechanism to ensure that accurate data is supplied to a requester. The cache coherence mechanism typically uses the size of the data transferred in a single request as the unit of coherence. The unit of coherence is commonly referred to as a cache line. In some processors, for example, a given cache line may be 64 bytes, while some processors employ a cache line of 32 bytes. In yet other processors, other numbers of bytes may be included in a single cache line. If a request misses in the L1 and L2 caches, an entire cache line of multiple words is transferred from main memory to the L2 and L1 caches.

Generally speaking, a lower-level cache such as an L2 cache, for example, may maintain coherency information for a higher-level cache such as an L1 cache. Inclusive cache implementations typically require back-probes of the higher-level cache in response to a variety of lower-level cache accesses. For example, the L2 cache may perform a "back-probe" of the L1 cache in response to receiving a probe to determine if a copy of an L2 cache line exists in the L1 cache. This back-probing of the higher-level cache may reduce the available bandwidth of the cache bus and thus may increase the latency associated with cache accesses.

SUMMARY OF THE INVENTION

Various embodiments of a cache memory system including a cache memory employing a tag including associated touch bits are disclosed. In one embodiment, a system is contemplated which includes a first cache memory subsystem having a first cache storage which is coupled to a second cache memory subsystem including a second cache storage. The first cache storage may be configured to store a first plurality of cache lines of data. The second cache storage may be configured to store a second plurality of cache lines of data. Further the second cache memory subsystem includes a tag storage which may store a plurality of tags each corresponding to a respective cache line of the second plurality of cache lines. In addition, each of said plurality of tags includes an associated bit indicative of whether a copy of the corresponding respective cache line is stored within the first cache memory subsystem.

In one specific implementation, if the associated bit is clear, a copy of the corresponding respective cache line is not stored within the first cache memory subsystem.

In another specific implementation, if the bit is set, a copy of said corresponding respective cache line of said second plurality of cache lines is stored within said first cache memory subsystem.

In another embodiment, a cache memory subsystem for use with a higher-level cache memory is contemplated in which the cache memory subsystem includes a cache storage configured to store a plurality of cache lines of data. The cache memory subsystem also includes a tag storage which may be configured to store a plurality of tags each corresponding to a respective cache line of the plurality of cache lines. Each of the tags includes an associated bit which is indicative of whether a copy of the corresponding respective cache line is stored within the higher-level cache memory.

Figure 1:
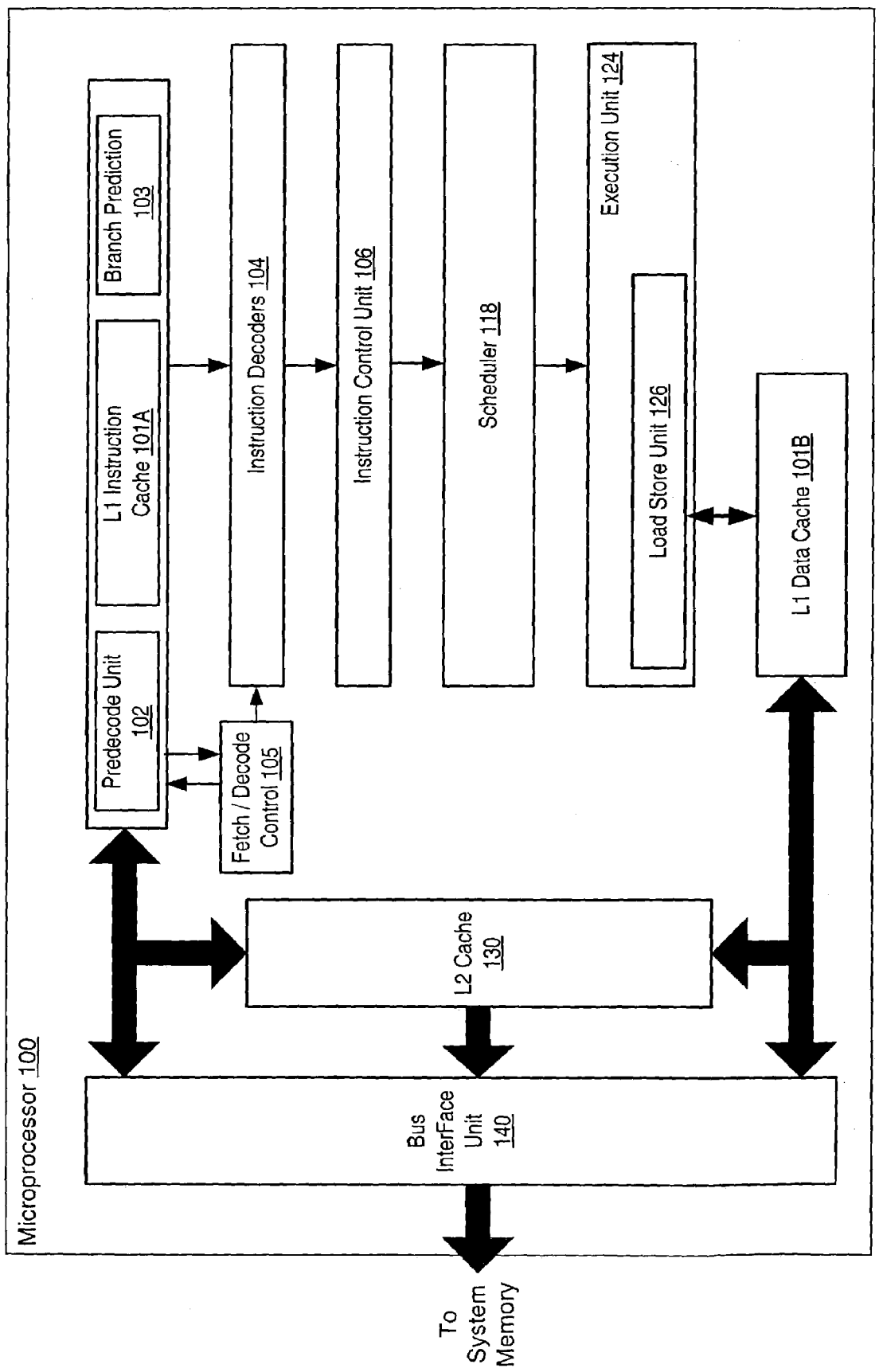
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a block diagram of one embodiment of an exemplary microprocessor 100 is shown. Microprocessor 100 is configured to execute instructions stored in a system memory (not shown in FIG. 1). Many of these instructions operate on data stored in the system memory. It is noted that the system memory may be physically distributed throughout a computer system and may be accessed by one or more microprocessors such as microprocessor 100, for example. In one embodiment, microprocessor 100 is an example of a microprocessor which implements the x86 architecture such as an Athlon™ processor, for example. However, other embodiments are contemplated which include other types of microprocessors.

In the illustrated embodiment, microprocessor 100 includes a first level one (L1) cache and a second L1 cache: an instruction cache 101A and a data cache 101B. Depending upon the implementation, the L1 cache may be a unified cache or a bifurcated cache. In either case, for simplicity, instruction cache 101A and data cache 101B may be collectively referred to as L1 cache where appropriate. Microprocessor 100 also includes a pre-decode unit 102 and branch prediction logic 103 which may be closely coupled with instruction cache 101A. Microprocessor 100 also includes a fetch and decode control unit 105 which is coupled to an instruction decoder 104; both of which are coupled to instruction cache 101A. An instruction control unit 106 may be coupled to receive instructions from instruction decoder 104 and to dispatch operations to a scheduler 118. Scheduler 118 is coupled to receive dispatched operations from instruction control unit 106 and to issue operations to execution unit 124. Execution unit 124 includes a load/store unit 126 which may be configured to perform accesses to data cache 101B. Results generated by execution unit 124 may be used as operand values for subsequently issued instructions and/or stored to a register file (not shown). Further, microprocessor 100 includes an on-chip L2 cache 130 which is coupled between instruction cache 10A, data cache 101B and the system memory.

Instruction cache 101A may store instructions before execution. Functions which may be associated with instruction cache 101A may be instruction loads, instruction pre-fetching, instruction pre-decoding and branch prediction. Instruction code may be provided to instruction cache 106 by pre-fetching code from the system memory through buffer interface unit 140 or as will be described further below, from L2 cache 130. Instruction cache 101A may be implemented in various configurations (e.g., set-associative, fully-associative, or direct-mapped). In one embodiment, instruction cache 10A may be configured to store a plurality of cache lines where the number of bytes within a given cache line of instruction cache 101A is implementation specific. Further, in one embodiment instruction cache 101A may be implemented in static random access memory (SRAM), although other embodiments are contemplated which may include other types of memory. It is noted that in one embodiment, instruction cache 101A may include control circuitry (not shown) for controlling cache line fills, replacements, and coherency, for example.

Instruction decoder 104 may be configured to decode instructions into operations which may be either directly decoded or indirectly decoded using operations stored within an on-chip read-only memory (ROM) commonly referred to as a microcode ROM or MROM (not shown). Instruction decoder 104 may decode certain instructions into operations executable within execution unit 124. Simple instructions may correspond to a single operation. In some embodiments, more complex instructions may correspond to multiple operations.

Instruction control unit 106 may control dispatching of operations to the execution unit 124. In one embodiment, instruction control unit 106 may include a reorder buffer for holding operations received from instruction decoder 104. Further, instruction control unit 106 may be configured to control the retirement of operations.

The operations and immediate data provided at the outputs of instruction control unit 106 may be routed to scheduler 118. Scheduler 118 may include one or more scheduler units (e.g. an integer scheduler unit and a floating point scheduler unit). It is noted that as used herein, a scheduler is a device that detects when operations are ready for execution and issues ready operations to one or more execution units. For example, a reservation station may be a scheduler. Each scheduler 118 may be capable of holding operation information (e.g., bit encoded execution bits as well as operand values, operand tags, and/or immediate data) for several pending operations awaiting issue to an execution unit 124. In some embodiments, each scheduler 118 may not provide operand value storage. Instead, each scheduler may monitor issued operations and results available in a register file in order to determine when operand values will be available to be read by execution unit 124. In some embodiments, each scheduler 118 may be associated with a dedicated one of execution unit 124. In other embodiments, a single scheduler 118 may issue operations to more than one of execution unit 124.

In one embodiment, execution unit 124 may include an execution unit such as and integer execution unit, for example. However in other embodiments, microprocessor 100 may be a superscalar processor, in which case execution unit 124 may include multiple execution units (e.g., a plurality of integer execution units (not shown)) configured to perform integer arithmetic operations of addition and subtraction, as well as shifts, rotates, logical operations, and branch operations. In addition, one or more floating-point units (not shown) may also be included to accommodate floating-point operations. One or more of the execution units may be configured to perform address generation for load and store memory operations to be performed by load/store unit 126.

Load/store unit 126 may be configured to provide an interface between execution unit 124 and data cache 101B. In one embodiment, load/store unit 126 may be configured with a load/store buffer (not shown) with several storage locations for data and address information for pending loads or stores. The load/store unit 126 may also perform dependency checking on older load instructions against younger store instructions to ensure that data coherency is maintained.

Data cache 101B is a cache memory provided to store data being transferred between load/store unit 126 and the system memory. Similar to instruction cache 101A described above, data cache 101B may be implemented in a variety of specific memory configurations, including a set associative configuration. In one embodiment, data cache 101B and instruction cache 101A are implemented as separate cache units. Although as described above, alternative embodiments are contemplated in which data cache 101B and instruction cache 101A may be implemented as a unified cache. In one embodiment, data cache 101B may store a plurality of cache lines where the number of bytes within a given cache line of data cache 101B is implementation specific. Similar to instruction cache 101A, in one embodiment data cache 101B may also be implemented in static random access memory (SRAM), although other embodiments are contemplated which may include other types of memory. It is noted that in one embodiment, data cache 101B may include control circuitry (not shown) for controlling cache line fills, replacements, and coherency, for example.

L2 cache 130 is also a cache memory and it may be configured to store instructions and/or data. In the illustrated embodiment, L2 cache 130 may be an on-chip cache and may be configured as either fully associative or set associative or a combination of both. In one embodiment, L2 cache 130 may store a plurality of cache lines. It is noted that L2 cache 130 may include control circuitry (not shown in FIG. 1) for controlling cache line fills, replacements, and coherency, for example.

As will be described in greater detail below in conjunction with the description of FIG. 2 and FIG. 3, in one embodiment, L2 cache 130 may employ a tag portion which includes an associated bit which may be indicative of whether a copy of the L2 cache line corresponding to a given L2 tag is stored within L1 cache 101. This bit is referred to as a 'touch' bit. In an alternative embodiment such as the embodiment illustrated in FIG. 3, L1 cache 101 may include cache line sizes which are different than the cache line size of L2 cache 130. In such an embodiment, L2 cache 130 may include a touch bit for each L1 cache line which corresponds to the L2 cache line.

Bus interface unit 140 may be configured to transfer instructions and data between system memory and L2 cache 130 and between system memory and L1 instruction cache 101A and L1 data cache 101B. In one embodiment, bus interface unit 140 may include buffers (not shown) for buffering write transactions during write cycle streamlining.

Figure 2:
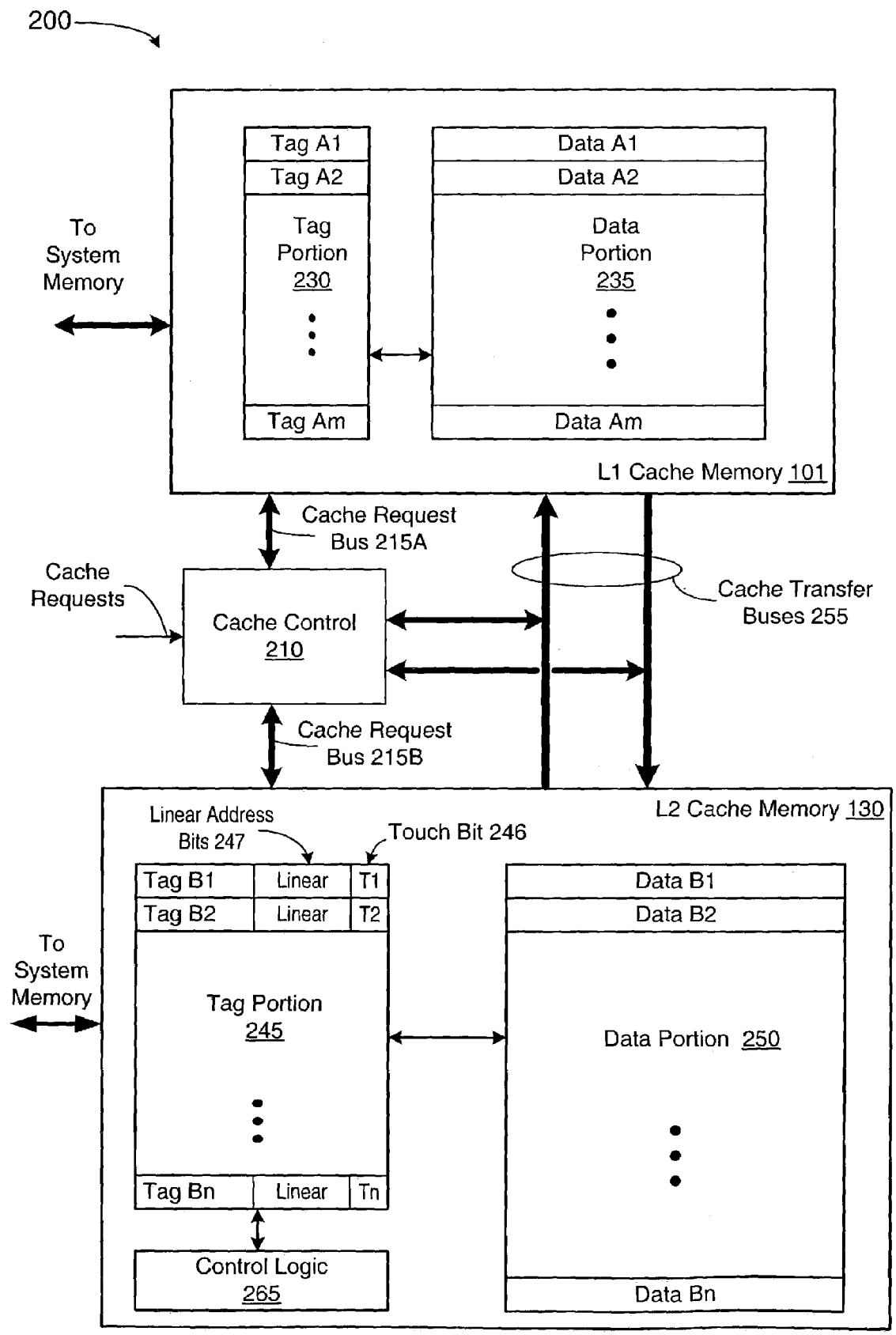
FIG. 2 is a block diagram of one embodiment of a cache memory system.

Referring to FIG. 2, a block diagram of one embodiment of an a cache memory system 200 is shown. Components that correspond to those shown in FIG. 1 are numbered identically for simplicity and clarity. In one embodiment, cache system 200 is part of microprocessor 100 of FIG. 1. Cache system 200 includes an L1 cache memory 101 coupled to an L2 cache memory 130 via a plurality of cache transfer buses 255. Further, cache system 200 includes a cache control 210 which is coupled to L1 cache memory 101 and to L2 cache memory 130 via cache request buses 215A and 215B, respectively. It is noted that although L1 cache memory 101 is illustrated as a unified cache in FIG. 2, other embodiments are contemplated that include separate instruction and data cache units, such as instruction cache 101A and L1 data cache 101B of FIG. 1, for example. It is also noted that L1 cache memory 101 and L2 cache memory 130 may each be referred to as a cache memory subsystem.

As described above, memory read and write operations are generally carried out using a cache line of data as the unit of coherency and consequently as the unit of data transferred to and from system memory. Caches are generally divided into fixed sized blocks called cache lines. The cache allocates lines corresponding to regions in memory of the same size as the cache line, aligned on an address boundary equal to the cache line size. For example, in a cache with 32-byte lines, the cache lines may be aligned on 32-byte boundaries. The size of a cache line is implementation specific although many typical implementations use either 32-byte or 64-byte cache lines.

In one embodiment, cache control 210 may include logic (not shown) which may control the transfer of data between L1 cache 101 and L2 cache 130. In addition, cache control 210 may control the flow of data between a requester and cache system 200. It is noted that although in the illustrated embodiment cache control 210 is depicted as being a separate block, other embodiments are contemplated in which portions of cache control 210 may reside within L1 cache memory 101 and/or L2 cache memory 130.

In the illustrated embodiment, L1 cache memory 101 includes a tag storage which is designated tag portion 230 and a data storage which is designated data portion 235. A cache line typically includes a number of bytes of data as described above and other information (not shown in FIG. 2) such as state information and pre-decode information. Each of the tags within tag portion 230 is an independent tag and may include address information corresponding to a cache line of data within data portion 235. The address information in the tag is used to determine if a given piece of data is present in the cache during a memory request. For example, a memory request includes an address of the requested data. Compare logic (not shown) within tag portion 230 compares the requested address with the address information within each tag stored within tag portion 230. If there is a match between the requested address and an address associated with a given tag, a hit is indicated as described above. If there is no matching tag, a miss is indicated. In the illustrated embodiment, tag A1 corresponds to data A1, tag A2 corresponds to data A2, and so forth, wherein each of data units A1, A2 ... Am is a cache line within L1 cache memory 101.

In the illustrated embodiment, L2 cache memory 130 also includes a tag storage which is designated tag portion 245 and a data storage which is designated data portion 250. Each of the tags within tag portion 245 includes address information corresponding to a cache line of data within data portion 250. In the illustrated embodiment, tag B1 corresponds to the cache line B1, tag B2 corresponds to the cache line B2, and so forth.

In addition, in one embodiment, an associated touch bit 246 is stored along with each of the tags in tag portion 245. The state of touch bit 246 may be indicative of whether a copy of the cache line corresponding to a given tag in the L2 cache memory is stored within the L1 cache 101. For example, in one embodiment, a set touch bit 246 may be indicative that a copy of the cache line corresponding to a given tag in the L2 cache memory is stored within the L1 cache 101 and a clear touch bit 246 may be indicative that a copy of the cache line corresponding to a given tag in the L2 cache memory is not stored within the L1 cache 101. This may be referred to as a precise indication. However, it is contemplated that in other embodiments the logic may be reversed such that a clear touch bit 246 may be indicative that a copy of the cache line corresponding to a given tag in the L2 cache memory is stored within the L1 cache 101 and a set touch bit 246 may be indicative that a copy of the cache line corresponding to a given tag in the L2 cache memory is not stored within the L1 cache 101. It is noted that as used herein in reference to the state of touch bit 246, the terms set and clear refer to a logic one and a logic zero, respectively.

It is noted that in an alternative embodiment, the state of touch bit 246 may be indicative of whether a copy of the cache line corresponding to a given tag in the L2 cache memory was at one time stored within the L1 cache 101. For example, certain L1 cache implementations provide no feedback to the L2 cache when an L1 cache line is evicted. When using such L1 cache implementations, in response to an initial cache request from the L1 cache, the touch bit 246 corresponding to the requested cache line may be set. However, that touch bit 246 may not be cleared in response to the eviction of the cache line copy from the L1 cache. Therefore, the touch bit may be indicative that the L2 cache line copy was stored in the L1 cache, but may or may not be stored there now. This may be referred to as an imprecise indication.

In another embodiment, L1 cache 101 may be implemented using an instruction cache and a data cache as described in conjunction with the description of FIG. 1. In such an embodiment, separate touch bits may be used for the L1 instruction cache and the L1 data cache.

It is noted that the touch bits described above may be applied generally to any lower level cache memory, wherein the touch bits may provide an indication of whether a copy of a cache line corresponding to a given tag in a lower-level cache memory is stored within a higher-level cache.

In the illustrated embodiment, control logic 265 may monitor accesses to tag portion 245 and thus to L2 cache memory 130. Control logic 265 may be configured to detect cache requests from various sources such as L1 cache memory 101, for example. In response to detecting a cache request from L1 cache memory 101, control logic 260 may be configured to set touch bit 246. For example, if a cache request misses in L1 cache 101, a request may be made to L2 cache 130. If there is a hit in L2 cache memory 130, the requested cache line, or portion thereof may be transferred to L1 cache memory 101 and to the originator of the request. Accordingly, the touch bit for that cache line may be set, indicating that a copy of the L2 cache line is stored within L1 cache memory 101. Further, in response to detecting that a copy of cache line has been evicted from the L1 cache memory 101, control logic 265 may be configured to clear touch bit 246.

As described above, cache line write-backs help maintain coherency between the caches and system memory. Another way a microprocessor may maintain cache coherency is by internally probing the caches and write buffers for a more recent version of the requested data. In addition, external devices may also check the caches within a microprocessor by externally probing the microprocessor. The touch bit 246 described above may reduce the amount of probing, particularly between caches. The touch bit may effectively act as a probe filter. For example, in response to a hit in L2 cache memory 130, control logic 265 may check the touch bit 246 corresponding to the cache line which hit. If the touch bit 246 is clear, then there is no need to back-probe L1 cache memory 101. If the touch bit is set, then L1 cache 101 may be back-probed to check for a more recent version of the requested data. In embodiments which employ two L1 caches (e.g., L1 instruction cache and an L1 data cache), if one of the corresponding L1 touch bits is set, then only that L1 cache may need to be back-probed.

Software which writes into a code segment is classified as self-modifying code (SMC). To avoid cache coherency problems due to SMC, a check is made during data writes to see whether the data-memory location corresponds to a code segment memory location. A conventional microprocessor may determine whether or not a write is in a code segment by internally probing the L1 instruction cache. If the probe returns a hit, the cache line in the L1 instruction cache may be invalidated and any corresponding prefetched instructions may also be invalidated. However, in the illustrated embodiment, the touch bit 246 may be used to reduce the amount of probing and also to determine whether an SMC check is necessary.

For example, in embodiments which employ two L1 caches (e.g., L1 instruction cache (L1 I-cache) and an L1 data cache (L1 D-cache)) such as described above, if the L1 D-cache requests a modified cache line from L2 cache memory 130, and the touch bit corresponding to the I-cache is clear, L2 cache memory 130 may return the requested cache line to the D-cache. If however, the touch bit corresponding to the I-cache is set, then control logic 265 of L2 cache memory 130 may initiate an SMC check prior to returning the requested data to the D-cache. Further, if the I-cache requests a cache line that is modified from L2 cache memory 130 and the touch bit corresponding to the D-cache is clear, then no SMC check need be performed. Conversely, if the touch bit corresponding to the D-cache is set, then an SMC check may need to be performed. Therefore, L2 cache memory 130 may detect the sharing of a modified cache line between the I-cache and the D-cache and to only allow one of them to have the modified line at any given time.

In one embodiment, L1 cache 101 may be linearly indexed and physically tagged. In such an embodiment, it is possible for the L1 cache 101 to have two copies of the same cache line in different places. This may occur when two cache lines have the same physical address but different linear addresses. This condition is referred to as linear aliasing. To prevent linear aliasing, L2 cache 130 may use the touch bit 246 to determine whether a possible linear alias is occurring. For example, if L1 cache 101 requests a cache line and touch bit 246 corresponding to that cache line is set, then a copy of that cache line may exist in L1 cache memory. In the illustrated embodiment, in addition to touch bit 246 being stored with the address tag, the linear address bits 247 of each cache line may also be stored with the address tag. Control logic 265 may use linear address bits 247 to index into L1 cache memory 101 during a back-probe to find the cache line copy. The copy may be evicted, and the requested cache line may be returned to L1 cache memory 101.

Many cache subsystems use a least recently used (LRU) algorithm to evict cache lines from a given cache. In other words, the cache line which is the least recently used may be evicted. However to more efficiently use L2 cache memory 130 and possibly reduce the number of back-probes to L1 cache memory 101, this LRU algorithm may be somewhat biased away from evicting cache lines which have a copy stored in a higher-level cache. For example, if L2 cache memory 130 is about to evict a given cache line, the corresponding touch bit 246 may be checked first to see if a cache line copy exists in L1 cache 101. If the corresponding touch bit 246 is set, it may be preferable to select a different cache line which has a clear touch bit 246 because if a cache line with a clear touch bit 246 is selected for eviction, it will not be necessary to evict the cache line copy from L1 cache 101.

In addition, when evicting a given cache line from L2 cache 130, if the corresponding touch bit 246 is clear, it may not be necessary to back-probe L1 cache 101. Further, in embodiments employing an L1 I-cache and an L1 D-cache as described above, if one of the corresponding touch bits is set, only that cache may need to be back-probed.

Figure 3:
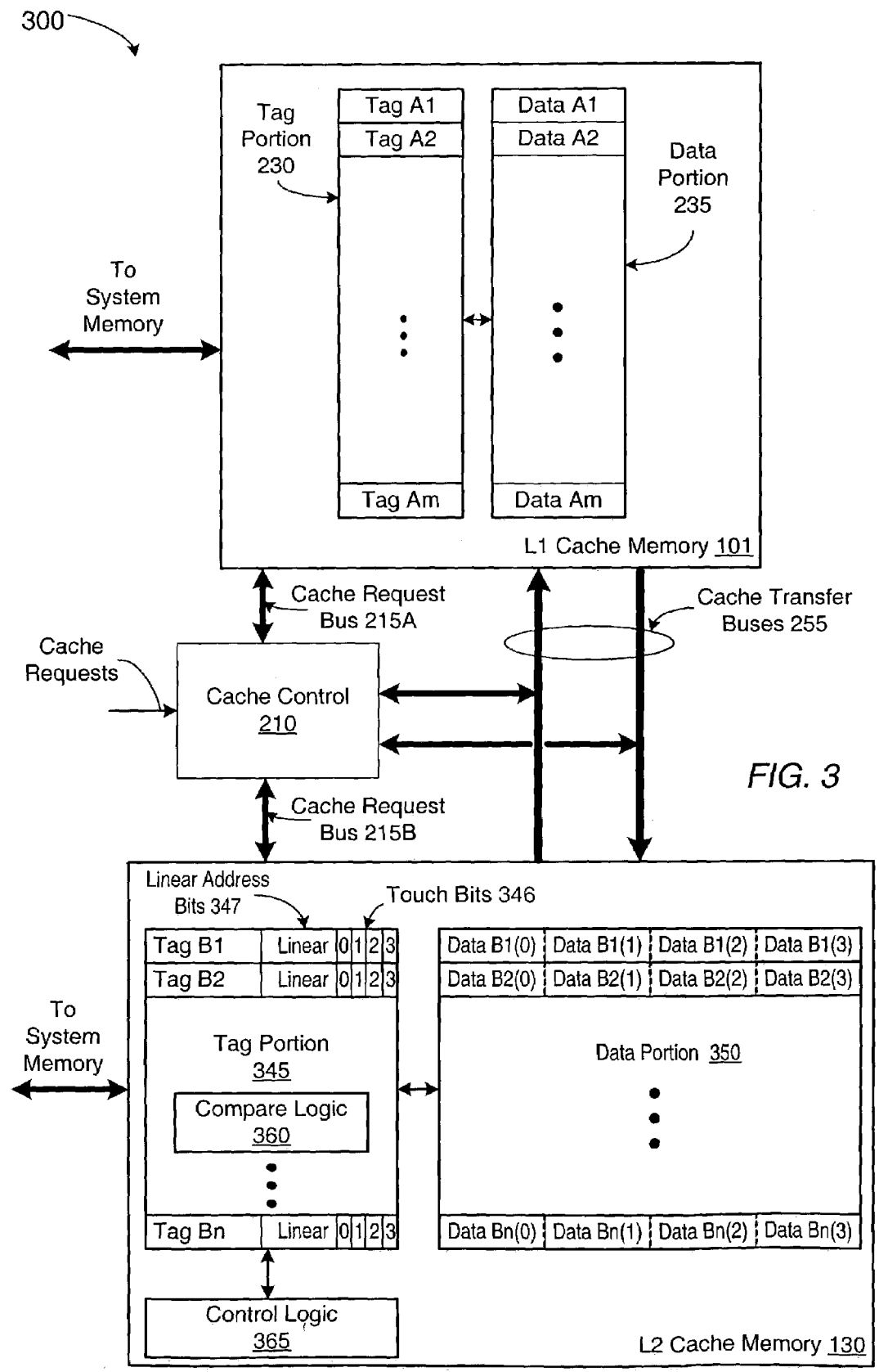
FIG. 3 is a block diagram of another embodiment of a cache memory system.

Turning to FIG. 3, a block diagram of another embodiment of a cache system 300 is shown. Components that correspond to those shown in FIG. 1 and FIG. 2 are numbered identically for simplicity and clarity. In one embodiment, cache system 300 is part of microprocessor 100 of FIG. 1. Cache system 300 includes an L1 cache memory 101 coupled to an L2 cache memory 130 via a plurality of cache transfer buses 255. Further, cache system 300 includes a cache control 210 which is coupled to L1 cache memory 101 and to L2 cache memory 130 via cache request buses 215A and 215B, respectively. It is noted that although L1 cache memory 101 is illustrated as a unified cache in FIG. 2, other embodiments are contemplated that include separate instruction and data cache units, such as instruction cache 101A and L1 data cache 101B of FIG. 1, for example.

As described above in conjunction with the description of FIG. 2, memory read and write operations are generally carried out using a cache line of data as the unit of coherency and consequently as the unit of data transferred to and from system memory.

Cache control 210 may include logic (not shown) which may control the transfer of data between L1 cache 101 and L2 cache 130. Similar to the embodiment described above in conjunction with the description of FIG. 2, cache control 210 may control the flow of data between a requester and cache system 300. It is noted that although in the illustrated embodiment cache control 210 is depicted as being a separate block, other embodiments are contemplated in which portions of cache control 210 may reside within L1 cache memory 101 and/or L2 cache memory 130.

Similar to the embodiment described above in conjunction with the description of FIG. 2, L1 cache memory 101 of FIG. 3 also includes a tag portion 330 and a data portion 335. Each of the tags within tag portion 230 is an independent tag and may include address information corresponding to a cache line of data within data portion 235. Compare logic (not shown) within tag portion 250 compares the requested address with the address information within each tag stored within tag portion 250. If there is a match between the requested address and an address associated with a given tag, a hit is indicated as described above. If there is no matching tag, a miss is indicated. In the illustrated embodiment, tag A1 corresponds to data A1, tag A2 corresponds to data A2, and so forth, wherein each of data units A1, A2 . . . Am is a cache line within L1 cache memory 101.

In the illustrated embodiment, L2 cache memory 130 also includes a tag portion 345 and a data portion 350. Each of the tags within tag portion 345 includes address information corresponding to a cache line of data within data portion 350. In the illustrated embodiment, each cache line includes four sub-lines of data. For example, tag B1 corresponds to the cache line B1 which includes the four sub-lines of data designated B1(0–3). Tag B2 corresponds to the cache line B2 which includes the four sub-lines of data designated B2(0–3), and so forth.

In the illustrated embodiment, a cache line in L1 cache memory 101 is equivalent to one sub-line of the L2 cache memory 130. For example, the size of a cache line of L2 cache memory 130 (e.g., four sub-lines of data) is a multiple of the size of a cache line of L1 cache memory 101 (e.g., one sub-line of data). In the illustrated embodiment, the L2 cache line size is four times the size of the L1 cache line. In other embodiments, different cache line size ratios may exists between the L2 and L1 caches in which the L2 cache line size is larger than the L1 cache line size. Accordingly, the amount of data transferred between L2 cache memory 130 and system memory (or an L3 cache) in response to a single memory request may be greater than the amount of data transferred between L1 cache memory 101 and L2 cache memory 130 in response to a single memory request.

During a cache transfer between L1 cache memory 101 and L2 cache memory 130, the amount of data transferred on cache transfer buses 255 each microprocessor cycle or "beat" is equivalent to an L2 cache sub-line, which is equivalent to an L1 cache line. A cycle or "beat" may refer to one clock cycle or clock edge within the microprocessor. In other embodiments, a cycle or "beat" may require multiple clocks to complete. In the illustrated embodiment, each cache may have separate input and output ports and corresponding cache transfer buses 255, thus data transfers between the L1 and L2 caches may be at the same time and in both directions. However, in embodiments having only a single cache transfer bus 255, it is contemplated that only one transfer may occur in one direction each cycle. In alternative embodiments, it is contemplated that other numbers of data sub-lines may be transferred in one cycle. In one embodiment, a sub-line of data may be 16 bytes, although other embodiments are contemplated in which a sub-line of data may include other numbers of bytes.

As described above in conjunction with the description of FIG. 2, touch bits may be used to indicate whether a copy of the cache line corresponding to a given tag in the L2 cache memory is stored within the L1 cache 101. In the embodiment of FIG. 3, associated touch bits 346 are similarly stored along with each of the tags in tag portion 345. The touch bits 346 are designated (0–3), and correspond to cache sub-lines (0–3), respectively. The state of each touch bit 346 of FIG. 3 may be indicative of whether a copy of the cache sub-line corresponding to a given tag in the L2 cache memory is stored within the L1 cache 101. As described above, this is referred to as a precise indication. For example, in one embodiment, a set touch bit 346 may be indicative that a copy of the cache sub-line corresponding to a given tag in the L2 cache memory is stored within the L1 cache 101 and a clear touch bit 346 may be indicative that a copy of the cache sub-line corresponding to a given tag in the L2 cache memory is not stored within the L1 cache 101.

It is noted that in an alternative embodiment, the state of each touch bit 346 may be indicative of whether a copy of the cache sub-line corresponding to a given tag in the L2 cache memory was at one time stored within the L1 cache 101. For example, certain L1 cache implementations provide no feedback to the L2 cache when a cache line is evicted. When using such L1 cache implementations, in response to an initial cache request from the L1 cache, the touch bit 346 corresponding to the requested cache sub-line may be set. However, that touch bit 346 may not be cleared in response to the eviction of the cache line copy from the L1 cache. Therefore, the touch bit may be indicative that the L2 cache sub-line copy was stored in the L1 cache, but may or may not be stored there now. This may be referred to as an imprecise indication.

In another embodiment, L1 cache 101 may be implemented using an instruction cache and a data cache as described in conjunction with the description of FIG. 1. In such an embodiment, separate touch bits may be used for the L1 instruction cache and the L1 data cache. Accordingly, there may be two touch bits for each of the touch bits 346 shown in FIG. 3.

Further, other embodiments are contemplated in which more than two L1 caches may be present. In still other embodiments, multiple processors (not shown) each having an L1 cache may all have access to the L2 cache memory 130. Accordingly, there may be a touch bit 346 which corresponds to each of the L1 caches of which L2 cache memory 130 is keeping track. Further, depending on the state of the touch bits, L2 cache memory 130 may be configured to notify a given L1 cache when its data has been displaced and to either write the data back or to invalidate the corresponding data as necessary.

It is noted that the touch bits 346 of FIG. 3 may be used by L2 cache 130 as described above in conjunction with the description of FIG. 2. For example, touch bits 346 of FIG. 3 may be used: to effectively filter probes, to determine when SMC checks may be needed, detect linear aliasing, to effectively bias the L2 cache eviction policy and to determine if back-probing is needed when evicting a cache line from the L2 cache. When evicting a cache line from the L2 cache, touch bits 346 may be used to determine which of the four possible L1 sub-lines should be back-probed.

Thus, the use of the touch bits in a lower-level cache such as an L2 cache may increase the available bandwidth of the cache subsystem by reducing the number of back-probes associated with a higher-level cache such as an L1 cache. Further, the use of the touch bits may simplify or eliminate some of the overhead operations associated with SMC checks and linear aliasing detection which conventional microprocessors may perform.

Figure 4:
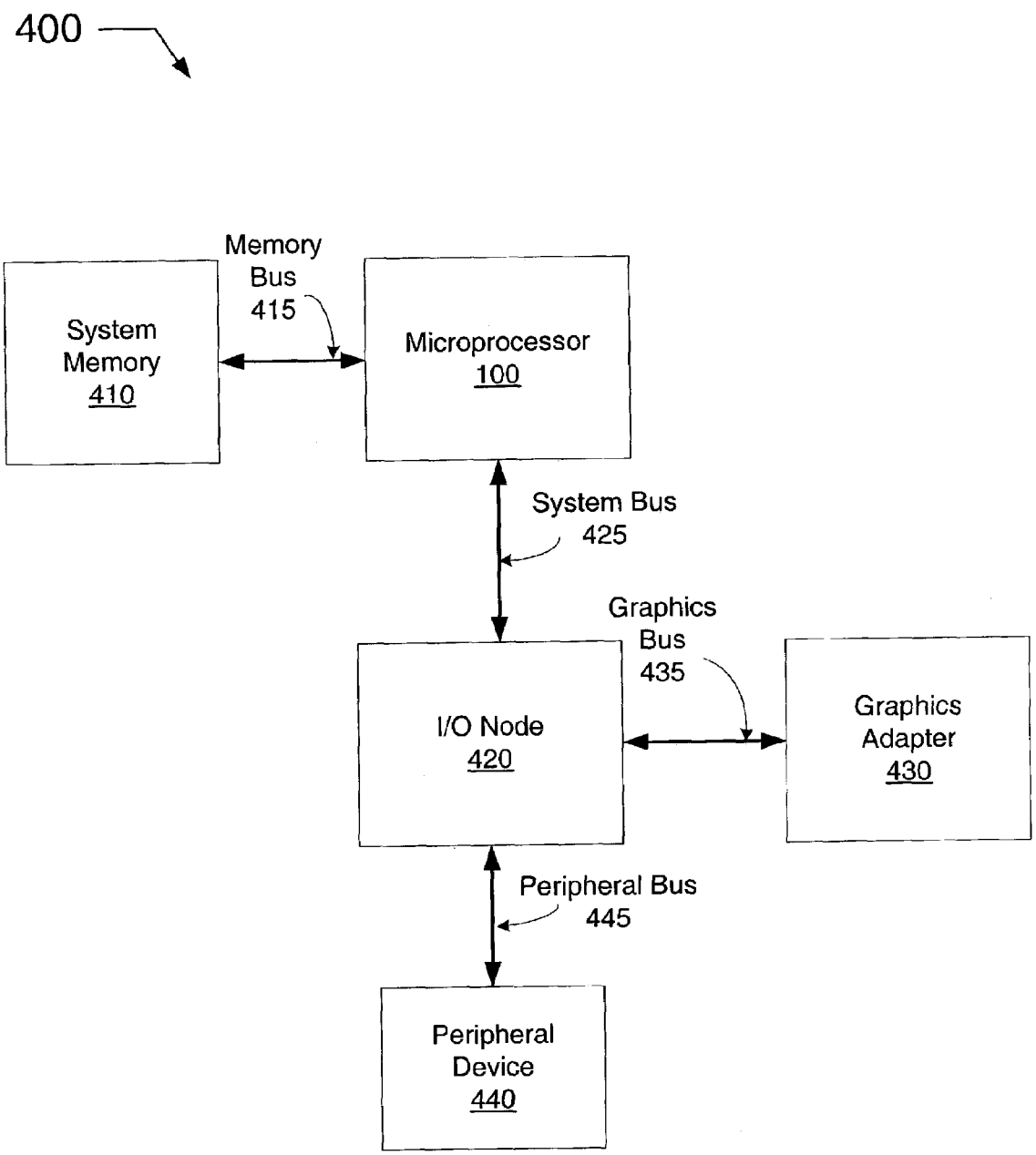
FIG. 4 is a block diagram of one embodiment of a computer system.

Turning to FIG. 4, a block diagram of one embodiment of a computer system is shown. Components that correspond to those shown in FIG. 1–FIG. 3 are numbered identically for clarity and simplicity. Computer system 400 includes a microprocessor 100 coupled to a system memory 410 via a memory bus 415. Microprocessor 100 is further coupled to an I/O node 420 via a system bus 425. I/O node 420 is coupled to a graphics adapter 430 via a graphics bus 435. I/O node 420 is also coupled to a peripheral device 440 via a peripheral bus.

In the illustrated embodiment, microprocessor 100 is coupled directly to system memory 510 via memory bus 515. For controlling accesses to system memory 510, microprocessor may include a memory controller (not shown) within bus interface unit 140 of FIG. 1, for example. It is noted however that in other embodiments, system memory 510 may be coupled to microprocessor 100 through I/O node 520. In such an embodiment, I/O node 520 may include a memory controller (not shown). Further, in one embodiment, microprocessor 100 includes a cache system such as cache system 200 of FIG. 2. In other embodiments, microprocessor 100 includes a cache system such as cache system 300 of FIG. 3.

System memory 510 may include any suitable memory devices. For example, in one embodiment, system memory may include one or more banks of dynamic random access memory (DRAM) devices. Although it is contemplated that other embodiments may include other memory devices and configurations.

In the illustrated embodiment, I/O node 520 is coupled to a graphics bus 535, a peripheral bus 540 and a system bus 525. Accordingly, I/O node 520 may include a variety of bus interface logic (not shown) which may include buffers and control logic for managing the flow of transactions between the various buses. In one embodiment, system bus 525 may be a packet based interconnect compatible with the HyperTransport™ technology. In such an embodiment, I/O node 520 may be configured to handle packet transactions. In alternative embodiments, system bus 525 may be a typical shared bus architecture such as a front-side bus (FSB), for example.

Further, graphics bus 535 may be compatible with accelerated graphics port (AGP) bus technology. In one embodiment, graphics adapter 530 may be any of a variety of graphics devices configured to generate and display graphics images for display. Peripheral bus 545 may be an example of a common peripheral bus such as a peripheral component interconnect (PCI) bus, for example. Peripheral device 540 may any type of peripheral device such as a modem or sound card, for example.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
    an instruction cache memory configured to store a first plurality of cache lines of data;
    a lower level cache memory coupled to said instruction cache memory, and configured to store a second plurality of cache lines of data; and
    a data cache memory coupled to the lower level cache memory, and configured to store a third plurality of cache lines of data;
    wherein the lower level cache memory further includes:
        a tag storage configured to store a plurality of tags each corresponding to a respective cache line of said second plurality of cache lines, wherein each of said plurality of tags includes an associated bit and a second associated bit, wherein the associated bit is indicative of whether a copy of said corresponding respective cache line of said second plurality of cache lines is stored within said, instruction cache memory, and the second associated bit is indicative of whether a copy of said corresponding respective cache line of said second plurality of cache lines is stored within said data cache memory; and
        tag logic coupled to said tag storage and configured to detect a cache request and an eviction notification from said instruction cache memory, and wherein said tag logic is further configured to clear said associated bit in response to detecting said eviction notification;
    wherein the tag logic is configured to detect sharing of a modified cache line between said instruction cache memory and said data cache memory based upon a state of said associated bit and said second associated bit;
    wherein the tag logic is configured to detect sharing if, in response to a cache line request for said modified cache line by the data cache memory, said associated bit indicates said modified cache line is stored in said instruction cache memory, and
    wherein the tag logic is further configured to cause a self-modifying code check to be initiated in response to detecting sharing of the modified cache line between the instruction cache memory and the data cache memory.

2. The system as recited in claim 1, wherein if said associated bit is clear, a copy of said corresponding respective cache line of said second plurality of cache lines is not stored within said instruction cache memory.

3. The system as recited in claim 1, wherein if said associated bit is set, a copy of said corresponding respective cache line of said second plurality of cache lines is stored within said instruction cache memory.

4. The system as recited in claim 1, wherein if said associated bit is set, a copy of said corresponding respective cache line of said second plurality of cache lines was stored within said instruction cache memory during a previous transaction.

5. The system as recited in claim 1 further comprising a cache control coupled to control the transfer of data between said instruction cache memory and said lower level cache memory.

6. The system as recited in claim 1, wherein said tag logic is further configured to set said bit in response to detecting said cache request.

7. The system as recited in claim 1 further comprising tag logic coupled to said tag storage and configured to detect whether two copies of said corresponding respective cache line of said second plurality of cache lines are stored within said instruction cache memory.

8. The system as recited in claim 7, wherein said tag logic is further configured to initiate a back-probe of said instruction cache memory and to cause one of said two copies to be evicted in response to detecting that two copies of said corresponding respective cache line of said second plurality of cache lines are stored within said instruction cache memory.

9. The system as recited in claim 1 further comprising tag logic coupled to said tag storage and configured to initiate a back-probe of said instruction cache memory in response to a system probe hitting on a given one of said second plurality of cache lines and said associated bit is set.

10. The system as recited in claim 1 further comprising tag logic coupled to said tag storage and configured to choose for eviction a given one of said second plurality of cache lines having a clear associated bit over another one of said second plurality of cache lines having an associated bit which is set.

11. The system as recited in claim 1 further comprising tag logic coupled to said tag storage and configured to initiate a back-probe of said instruction cache memory in response to evicting one of said second plurality of cache lines having an associated bit which is set.

12. A microprocessor comprising:
an execution unit configured to execute instructions; and
a cache system coupled to said execution unit, said cache system includes:
an instruction cache configured to store a first plurality of cache lines of data;
a lower level cache coupled to said instruction cache, and configured to store a second plurality of cache lines of data; and
a data cache coupled to the lower level cache, and configured to store a third plurality of cache lines of data;
wherein the lower level cache further includes:
a tag storage configured to store a plurality of tags each corresponding to a respective cache line of said second plurality of cache lines, wherein each of said plurality of tags includes an associated bit and a second associated bit, wherein the associated bit is indicative of whether a copy of said corresponding respective cache line of said second plurality of cache lines is stored within said instruction cache, and the second associated bit is indicative of whether a copy of said corresponding respective cache line of said second plurality of cache lines is stored within said data cache; and
tag logic coupled to said tag storage and configured to detect a cache request and an eviction notification from said instruction cache, and wherein said tag logic is further configured to clear said bit in response to detecting said eviction notification;
wherein the tag logic is configured to detect sharing of a modified cache line between said instruction cache and said data cache based upon a state of said associated bit and said second associated bit;
wherein the tag logic is configured to detect sharing if, in response to a cache line request for said modified cache line by the data cache, said associated bit indicates said modified cache line is stored in said instruction cache, and
wherein the tag logic is further configured to cause a self-modifying code check to be initiated in response to detecting sharing of the modified cache line between the instruction cache and the data cache.

13. The microprocessor as recited in claim 12, wherein if said associated bit is clear, a copy of said corresponding respective cache line of said second plurality of cache lines is not stored within said first instruction cache.

14. The microprocessor as recited in claim 12, wherein if said associated bit is set, a copy of said corresponding respective cache line of said second plurality of cache lines is stored within said instruction cache.

15. A method comprising:
storing a first plurality of cache lines of data in an instruction cache;
storing a second plurality of cache lines of data in a lower level cache memory subsystem;
storing a third plurality of cache lines of data in a data cache
storing a plurality of tags each corresponding to a respective cache line of said second plurality of cache lines, wherein each of said plurality of tags includes an associated bit and a second associated bit, wherein the associated bit is indicative of whether a copy of said corresponding respective cache line of said second plurality of cache lines is stored within said instruction cache, and the second associated bit is indicative of whether a copy of said corresponding respective cache line of said second plurality of cache lines is stored within said data cache;
detecting a cache request and an eviction notification from said instruction cache;
clearing said bit in response to detecting said eviction notification;
detecting sharing of a modified cache line between said instruction cache and said data cache by detecting, in response to a cache line request for said modified cache line by the data cache, that said associated bit indicates said modified cache line is stored in said instruction cache; and
causing a self-modifying code check to be initiated in response to detecting sharing of the modified cache line between the instruction cache and the data cache.

16. The method as recited in claim 15, further comprising setting said associated bit in response to receiving a cache request from said instruction cache and said bit is clear.

17. The method as recited in claim 15 further comprising clearing said associated bit in response to receiving from said first cache memory subsystem a notification indicative that said copy of said corresponding respective cache line stored within said instruction cache has been evicted.

18. The system as recited in claim 1, wherein the tag logic is further configured to detect sharing of a modified cache line between said instruction cache memory and said data cache memory if, in response to a cache line request for said modified cache line by the instruction cache memory, said second associated bit indicates said modified cache line is stored in said data cache memory.

19. The microprocessor as recited in claim 12, wherein the tag logic is further configured to detect sharing of a modified cache line between said instruction cache and said data cache if, in response to a cache line request for said modified cache line by the instruction cache, said second associated bit indicates said modified cache line is stored in said data cache.

20. The method as recited in claim 15, further comprising detecting sharing of a modified cache line between said instruction cache and said data cache by, in response to a cache line request for said modified cache line by the instruction cache, detecting that said second associated bit indicates said modified cache line is stored in said data cache.

* * * * *